Sept. 28, 1926.  
J. E. HARRIS  
1,601,066  
ELECTRON DISCHARGE DEVICE  
Filed Dec. 8, 1922
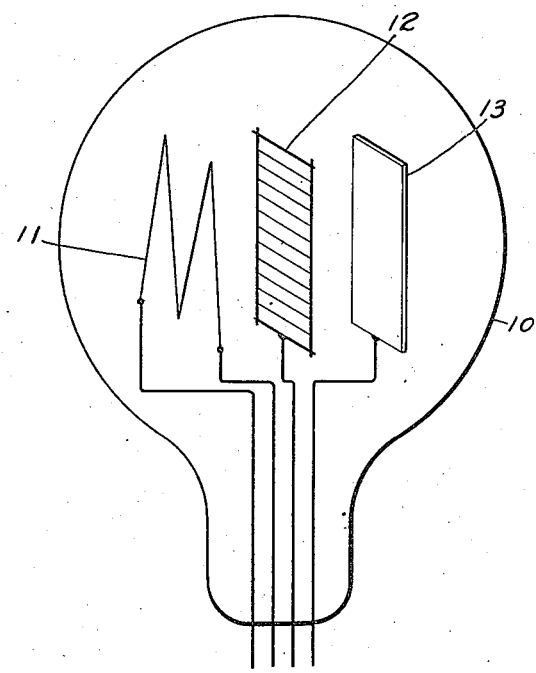
Inventor:  
James E. Harris  
by. [signature], Atty.

Patented Sept. 28, 1926.

1,601,066

UNITED STATES PATENT OFFICE.

JAMES E. HARRIS, OF NEWARK, NEW JERSEY, ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed December 8, 1922. Serial No. 605,557.

This invention relates to electron discharge devices and more especially to vacuum tubes of the audion type, and has as its object to increase the efficiency and improve the operation of such devices.

In power tubes equipped with alkaline earth oxide cathodes, considerable difficulty has been experienced due to the vaporization of the oxides from the filament and the deposition thereof on the grid. The presence of the alkaline earth oxides on the grid causes it to become a secondary source of electrons under electron bombardment, and under certain conditions the rate of emission of the secondary electrons becomes so great as to prevent the normal functioning of the tube.

This invention provides an oxidized metal grid which contains as one of its constituents, a metal whose oxide forms stable compounds with the alkaline earth oxides. In one embodiment of the invention, the grid material is a nickel chromium alloy and the chromic oxide unites with the alkaline earth oxides deposited thereon to form chromites which are very stable chemically and are not thermionically active, thereby preventing the grid from becoming a countersource of electrons.

Referring now to the drawings, the single figure thereof represents a vacuum tube of the audion type.

Within an envelope 10 are arranged a cathode 11, a grid 12 and an anode 13, the grid being interposed between the cathode and the plate. The cathode is composed of alkaline earth oxides which are very active thermionically and somewhat volatile at high temperatures. Preferably, the cathode comprises a filament of platinum or an alloy thereof, on which is provided alternate coatings of barium and strontium oxides. The grid 12 comprises frame supporting lateral wires, the frame and wires being composed of a material, such as an alloy of nickel and chromium. The oxide of chromium combines with barium and strontium oxides to form chemically stable and thermionically inactive compounds, the surface of the grid being oxidized. The plate 13 is preferably of nickel.

In the operation of this device, when the cathode is heated to a very high temperature, some of the barium and strontium oxides volatilizes and is deposited on the grid. These oxides combine with the chromic oxide which is one of the constituents of the grid, to form barium and strontium chromite. The chromites of barium and strontium are very stable chemically at high temperatures and are not thermionically active. The combining of the volatilized barium and strontium oxides with the chromic oxide to these alkaline earth compounds on the grid prevents the latter from becoming a source of secondary electron emission, and the normal functioning of the tube is in no way impaired.

Although this invention has been disclosed in connection with a cathode coated with barium and strontium oxides and a grid formed of a nickel chromium alloy, it is to be understood that the various other materials may be used without departing from the spirit of the invention as set forth in the appended claims.

The invention claimed is:

1. In an electron discharge device, a cathode composed of alkaline earth oxides and an oxidized metallic grid, one of the constituents of said grid metal being capable of forming thermionically inactive compounds with said alkaline earth oxides.

2. In an electron discharge device, a cathode composed of alkaline earth oxides, and an oxidized nickel chromium alloy grid.

3. In an electron discharge device, a cathode containing barium and strontium oxides and an oxidized grid, said grid having as a constituent a material capable of forming thermionically inactive compounds with said oxides.

4. In an electron discharge device, a cathode composed of barium and strontium oxides and an oxidized nickel chromium alloy grid.

5. An electron discharge device comprising a cathode composed of thermionically active material and a grid electrode composed of a material which forms with the material of the cathode a chemically stable and thermionically inactive compound upon said grid.

6. In an electron discharge device, a cathode composed of alkaline earth oxides, and a grid having chromic oxide as one of its constituents.

7. An electron discharge device comprising a cathode composed of alkaline earth oxides and a grid having a constituent capable of uniting with said alkaline earth oxides to form a chemically stable and thermionically inactive compound upon said grid.

In witness whereof, I hereunto subscribe my name this 4th day of December A. D. 1922.

JAMES E. HARRIS.